Dec. 12, 1933.  A. DINA  1,938,813
VENTILATING AND FIRE SHUTTER FOR MOTION PICTURE PROJECTION MACHINES
Filed March 1, 1930  4 Sheets-Sheet 3
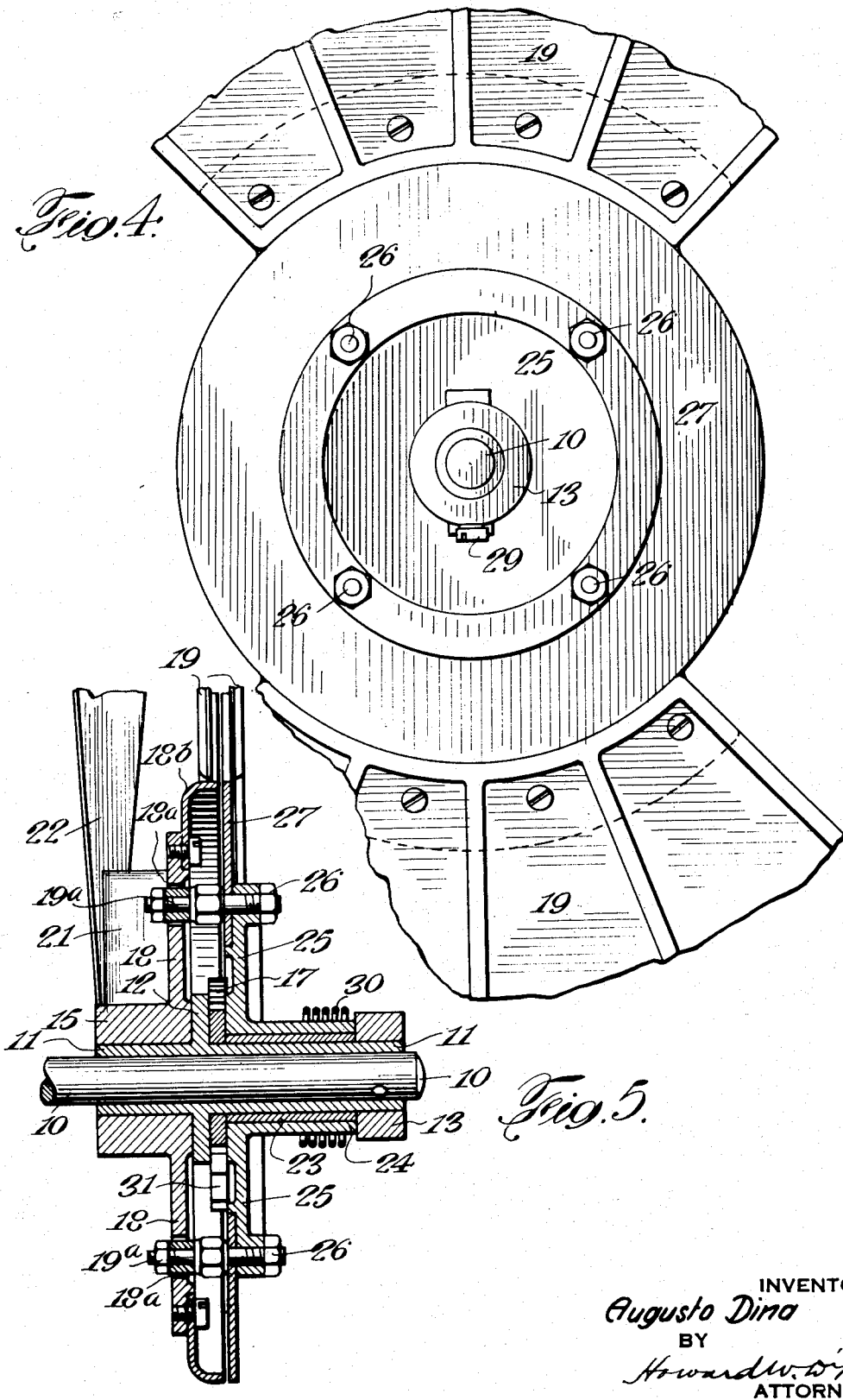
INVENTOR
Augusto Dina
BY
Howard W. Dix
ATTORNEY Dec. 12, 1933.   A. DINA   1,938,813
VENTILATING AND FIRE SHUTTER FOR MOTION PICTURE PROJECTION MACHINES
Filed March 1, 1930   4 Sheets-Sheet 4

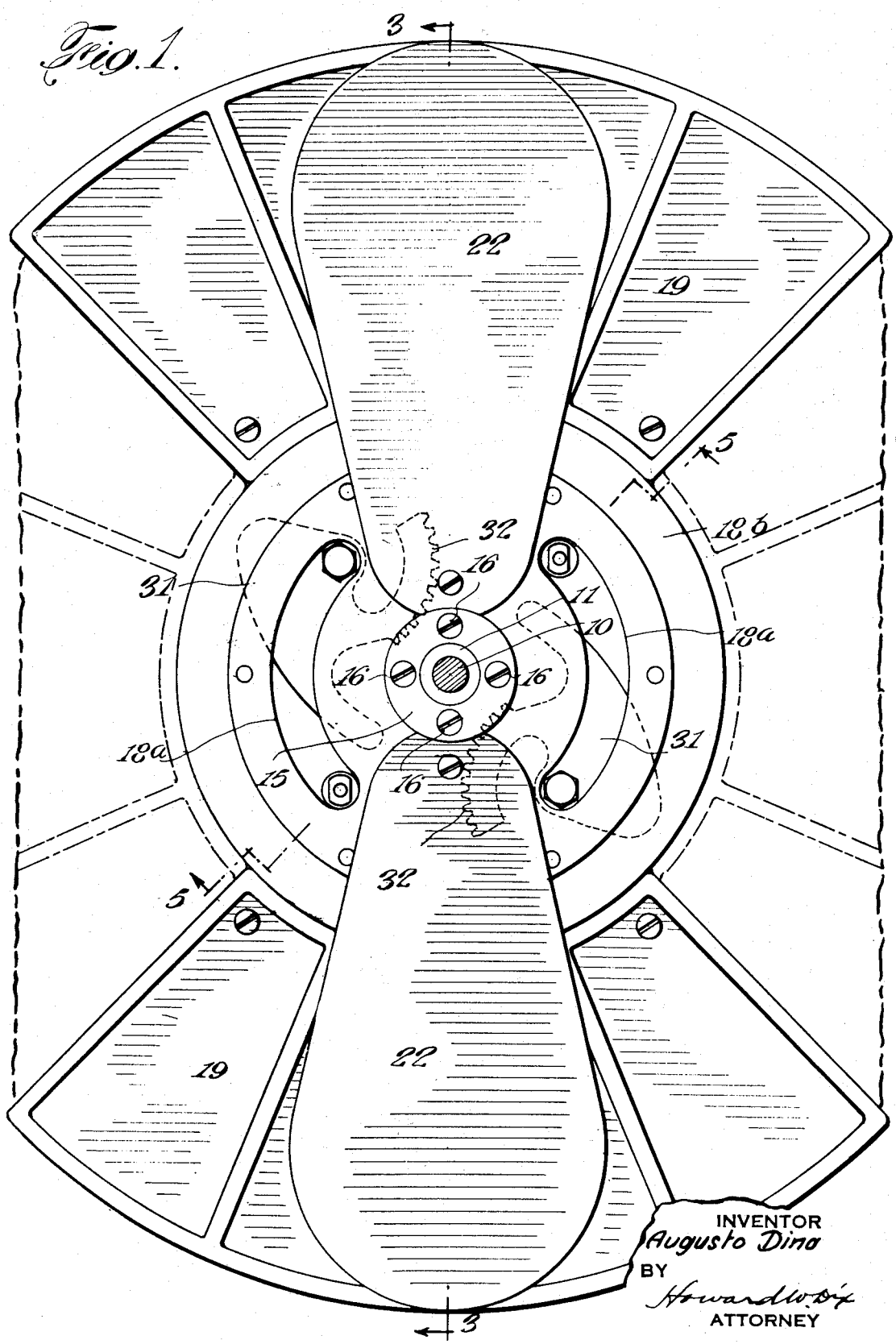

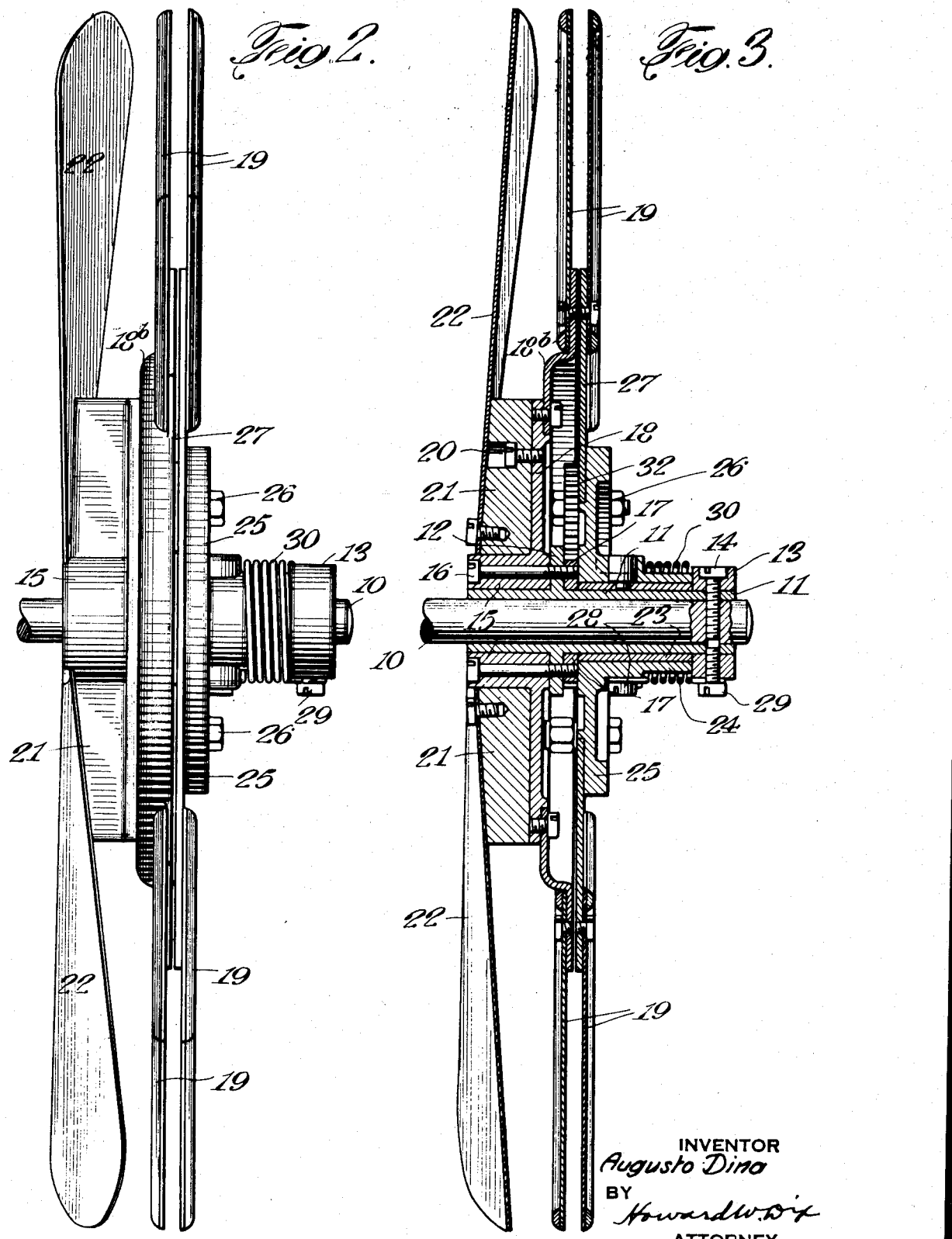

INVENTOR
Augusto Dina
BY
Howard W. Dix
ATTORNEY

Patented Dec. 12, 1933

1,938,813

UNITED STATES PATENT OFFICE 1,938,813

VENTILATING AND FIRE SHUTTER FOR MOTION PICTURE PROJECTION MACHINES

Augusto Dina, Elizabeth, N. J., assignor to International Projector Corporation, New York, N. Y., a corporation of Delaware Application March 1, 1930. Serial No. 432,312

5 Claims. (Cl. 88—19.3)

This invention relates to new and useful improvements in ventilating and fire shutters especially adaptable for use on motion picture projectors and wherein the improved shutters will act as ordinary shutters when the machine is running, but which will automatically act as an efficient and capable fire shutter as soon as the machine stops running or the speed drops below a predetermined amount.

The main object of the invention is to provide a simple, compact, and automatically operable shutter which will act under the influence of centrifugal force when running, to function as a normal projection shutter and which will automatically assume a condition, when the speed drops, such as to cause it to act as a fire shutter.

A further object is to combine the above mentioned fire shutter with a relatively small, simple, compact, and efficient ventilating device which will cause sufficient flow of air near the film to keep it and the head of the projector cool.

A still further object is to provide an improved shutter which will ventilate the film and the head and at the same time will not make so much noise or vibration, and that requires only a small amount of power to operate.

Further and more specific objects, features, and advantages will more clearly appear from the detailed description given below when taken in connection with the accompanying drawings which form part of the specification and which illustrate one present preferred form of the invention.

In general terms the invention herein preferably comprises a plurality of shutter elements disposed on a shutter shaft with their blade surfaces at right angles to the axis of the shaft, and with a ventilating element separate from the blades but associated with and movable with the shaft. The ventilating element is preferably in the form of a small blade associated with and movable with the shaft and disposed adjacent the particular shutter element which is fixed to the shaft and on the side thereof away from the second shutter element. Of the pair of shutter elements one is fixed to the shaft and the other is movable in respect thereto but is movable relative to the fixed element also. In addition there is disposed therebetween certain centrifugal means whereby the elements, which have a normal position when the shaft is not running, will be given relative movement when the shaft is rotating to cause them to aline and act as a pure projection shutter. When the shaft is not rotating, the normal position of the elements is such that the blade portions of the one will overlap the gaps between the blade portions of the other and thus cause the whole device to act as a fire shutter to prevent the burning of the film and the over heating of the head portion of the projector.

The present preferred form of the invention is illustrated in the drawings in which, Fig. 1 is a front elevation of the device with the blades in their relative position when acting as a projection shutter; and showing the closed position of the elements in dotted lines;

Fig. 2 is a side elevation thereof;

Fig. 3 is a central vertical section taken on the line 3—3 of Fig. 1;

Fig. 4 is a rear elevation of the device with portions broken away;

Fig. 5 is a section taken on the line 5—5 of Fig. 1; and

Figure 6:
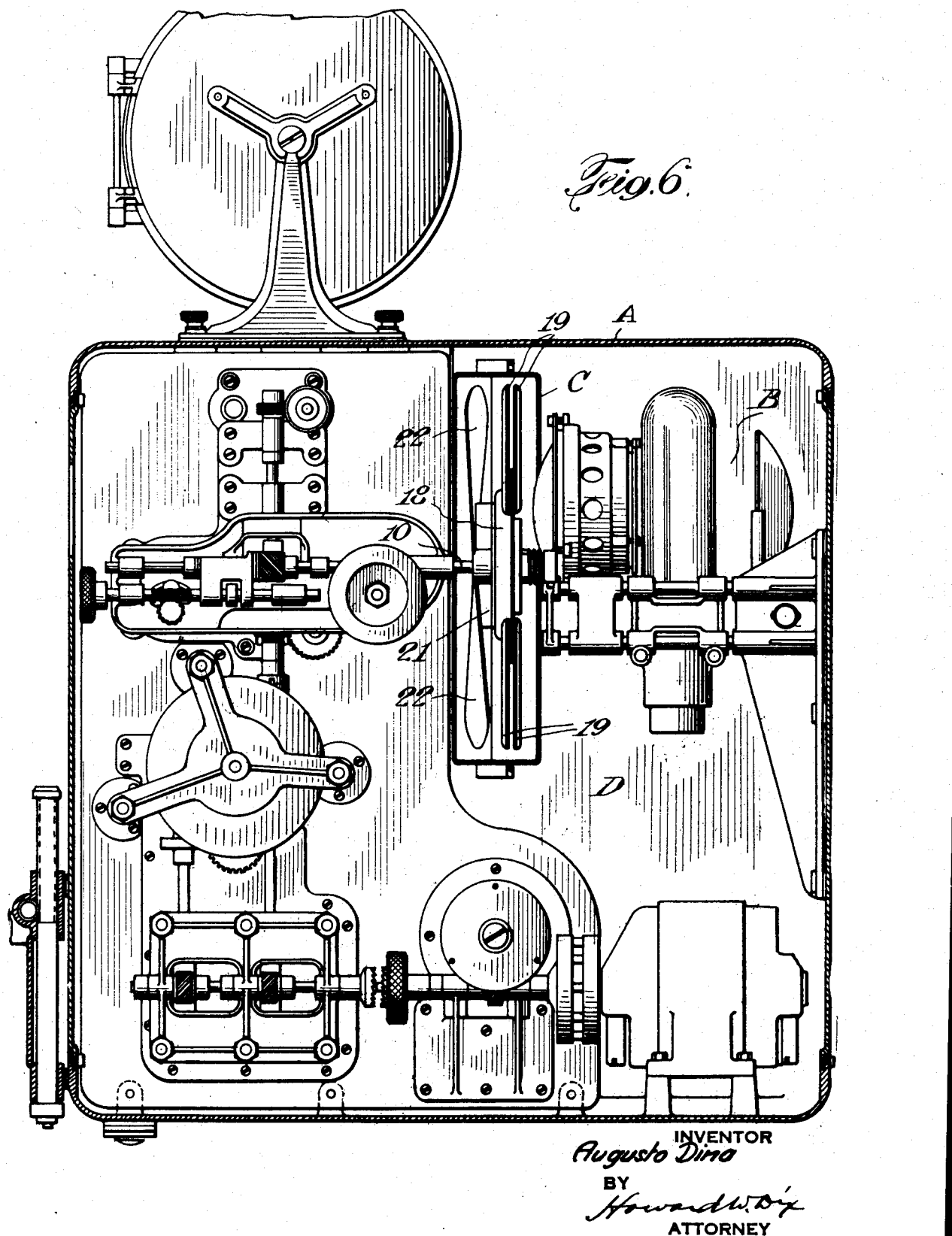
Fig. 6 is a side elevation of a machine using this invention.

The present invention may be used on a projector machine as shown in Fig. 6, which includes a casing A housing a lamp assembly B, the shutter guard casing C, and a partition or wall D on which practically the entire mechanism of the projector is mounted. The present preferred form of the invention comprises a shutter shaft 10 to which is fastened a sleeve 11 having a flange 12. The sleeve is preferably fastened to the shaft by means of the screw 14 passing through the sleeve and also through a collar 13 thereon.

On one side of the flange 12 there is disposed a hub 15 fastened by screws 16 to the flange 12. A ring gear 17 is also fastened to the other side of the flange 12 by means of screws 16. To the hub 15 there is integrally connected a radial plate 18 on the outer periphery of which there is fastened a ring plate 18b to the periphery of which in turn there is fastened oppositely disposed shutter blades such as 19. To the front face of the plate 18 there is fastened by screws 20 a block 21 to the front sloping face of which are fastened ventilator blades such as 22 which have their surfaces inclined at an angle to the axis of the shaft 10 to create a moving column of air when the shaft is running. This moving air operates to cool the head and the film.

Around the sleeve 11 there is also disposed a spacing ring sleeve 23 on which is disposed another sleeve 24 having a radial flange plate 25 to the inner face of which, by means of bolts 26, is fastened a plate 27 having at its periphery the similar oppositely disposed blades 19 as on the previously described plate 18, or 18b.

As seen in Fig. 5 the plate 15 has curved slots 18a to receive the ends of studs 19a extending therethrough from the bolts 26 and forming means to limit the end of movement of the blade elements in either direction between the plates 15 and 27.

A spring extends from the screw 28 around the sleeve 24 to beneath the screw 29 on the collar 13. This spring 30 is designed to tend to move the blades on the plate 27 to a position where they will aline themselves with the gaps between the blade on the plate 18 and thus form a fire shutter to prevent the burning of the film and excessive heating of the head when the shutter shaft slows down.

In order to open the blades from the above described normal closed position it is desirable to provide a suitable means which in this instance has taken the form of two centrifugally operated wing elements such as 31 having rack portions 32 which engage with the teeth of the ring gear 17 fastened to the shaft 10. These wing elements are pivoted on bolts 26 and their mass opposite the pivot points and opposite the rack portions is relatively large and relatively heavy so that as they swing and are rotated around the shaft, they will tend to swing out and make the racks roll around the gear 17. This will cause the plate 25 and the blades 19 thereon to change position.

In the operation of the device, the shutter shaft is started, and in this moment the blades are disposed with their parts forming the complete barrier to the light and heat on the film, but as soon as the speed exceeds a certain value then the wing elements 31 will commence to act and will swing the plate 25 around so that the blades thereon will gradually aline themselves with the blades on the plate 18b. Then the device will act as a normal projection light shutter. As soon as the speed drops off the spring 30 will commence to draw the plate 27 back to its normal position above described. The reduction or dropping of the centrifugal effect will also cause the blades on ring 27 to move to close the gaps between the blades on the ring 18b.

The ventilator element 22 will cause just sufficient draft to cool the film and the head without creating to much agitation of the surrounding air. The blades 19 being disposed in the plane at right angles to the axis of rotation of the shaft 10, will require very little power to turn them.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications which may come within the language or scope of any one or more of the appended claims.

What is claimed, is,

1. A shutter device which comprises a shaft, a pair of shutter elements disposed thereon, one of said elements fixed to the shaft, the other element movable with the shaft but also movable relative to the other element, centrifugally acting means to cause a change in relative position of the elements when the shaft starts to rotate, and a ventilator blade fastened to the fixed element.

2. A shutter device which comprises a shaft, a pair of shutter elements disposed thereon, one of said elements fixed to the shaft, the other element movable with the shaft but also movable relative to the other element, centrifugally acting means to cause a change in relative position of the elements when the shaft starts to rotate, a ventilator blade fastened to the fixed element and having a surface bent at an angle to the plane of rotation, said shutter elements having surfaces disposed in planes at right angles to the axis of the shaft.

3. A shutter device which comprises a shaft, a pair of shutter elements disposed thereon, one of said elements fixed to the shaft, the other element movable with the shaft but also movable relative to the other element, centrifugally acting means to cause a change in relative position of the elements when the shaft starts to rotate, a ventilator blade fastened to the fixed element and having a surface bent at an angle to the plane of rotation, said shutter elements having surfaces disposed in planes at right angles to the axis of the shaft, said elements having normal positions wherein the blades of one element will aline with the gaps between the blades of the other element to form a fire shutter, said centrifugally acting means adapted to move one of the blades from its normal position when the device starts to rotate and to move it into alinement with the other element so that the blade portions of the one will overlap the blade portions of the other.

4. A shutter device which comprises a shaft, a pair of shutter elements disposed thereon, one of said elements fixed to the shaft, the other of said elements movable with respect to the shaft, and a ventilator blade fastened to said fixed element.

5. A shutter device which comprises a shaft, a pair of shutter elements disposed thereon, one of said elements fixed to the shaft, the other of said elements movable with respect to the shaft, the blades of the elements disposed in planes at right angles to the axis of the shaft, and a ventilator blade fastened to said fixed element.

AUGUSTO DINA.